United States Patent
Kosaka

[11] Patent Number: 6,091,539
[45] Date of Patent: Jul. 18, 2000

[54] OPTICAL AMPLIFIER APPARATUS AND CONTROL METHOD THEREOF, AND OPTICAL TRANSMISSION SYSTEM USING OPTICAL AMPLIFIER APPARATUS

[75] Inventor: Junya Kosaka, Fujisawa, Japan

[73] Assignee: Hitachi, Ltd., Tokyo, Japan

[21] Appl. No.: 09/038,899

[22] Filed: Mar. 12, 1998

[30] Foreign Application Priority Data

Mar. 12, 1997 [JP] Japan ................................. 9-057263

[51] Int. Cl.$^7$ ............................. H01S 3/00; H04J 14/02
[52] U.S. Cl. ................................. 359/341; 359/124
[58] Field of Search ....................... 359/341, 124, 359/176, 177, 160, 161

[56] References Cited

U.S. PATENT DOCUMENTS

| | | | |
|---|---|---|---|
| 5,436,760 | 7/1995 | Nakabayashi | 359/341 |
| 5,557,442 | 9/1996 | Huber | 359/179 |
| 5,675,432 | 10/1997 | Kosaka | 359/341 |
| 5,861,980 | 1/1999 | Ono | 359/341 |

Primary Examiner—Mark Hellner
Attorney, Agent, or Firm—Antonelli, Terry, Stout & Kraus, LLP

[57] ABSTRACT

An optical amplifier apparatus, for amplifying inputted multiplexed optical signals, comprising:

optical adjusting means for adjusting the inputted multiplexed optical signals in optical power thereof with a certain characteristic of gain;

optical amplifying means for amplifying the optical power of the adjusted multiplexed optical signals with a characteristic of gain which is reversed to that of said adjusting means;

optical splitting means for splitting a part of the amplified multiplexed optical signals as an output optical signal and for splitting another part thereof as a detection optical signal;

optical signal detecting means for inputting said detection optical signal which is split; and a controller apparatus for controlling said adjusting means and said optical amplifying means upon an output from said optical signal detecting means, wherein an output gain characteristic in the optical power of said optical amplifying means is flatten at a predetermined value.

13 Claims, 9 Drawing Sheets

OPTICAL AMPLIFIER APPARATUS AND
CONTROL METHOD THEREOF, AND
OPTICAL TRANSMISSION SYSTEM USING
OPTICAL AMPLIFIER APPARATUS

BACKGROUND OF THE INVENTION

1. Field of the Invention

The present invention relates to an optical amplifier apparatus and a controlling method thereof, and an optical transmission system using the optical amplifier apparatus, and it relates, in particular to the optical amplifier apparatus and the optical transmission system being suitable to be applied to a wavelength multiplexing optical transmission system.

2. Description of Related Art

In recent years, accompanying with requirement of a low cost optical system, an optical transmission system of so-called a wavelength multiplexing optical transmission system has been studied, in which a plurality of optical signals different in wavelength thereof are multiplexed to be transferred through a single optical transmission fiber.

On the other hand, an optical amplifier apparatus, since it has a wide range in wavelength of optical signal to be amplified therewith and it has an ability of amplifying with low noise, is suitable for use as an amplifier apparatus in the wavelength multiplexing optical transmission system. Optical fiber added with a rare-earth material or metal therein or a semiconductor amplifier, which can construct the optical amplifier apparatus, has a dependency on the wavelength in gain thereof, therefore, a difference is occurred in an optical output or in the gain, for each wavelength, after amplification therewith.

The above-mentioned difference in the wavelength is added up or integrated, in particular in multistage in-line amplification with the optical amplifier apparatuses, thereby increasing the difference in optical power for the each wavelength. As a result of this, a maximum transmission distance in a total system is restricted by deterioration in a S/N ratio of the optical wavelength having the lowest power among the multiplexed wavelengths. Accordingly, it is very important to provide an optical amplifier apparatus having an ensured characteristic of flatness, i.e., no difference in the optical output for every wavelength, in the gain thereof.

Therefore, as a conventional method, there has been already known a method, "Flattening of characteristic in collective amplification of multi-wavelengths with an optical fiber amplifier using a control of amplification factor of fiber", in Institute of Electronics, Information and Communication Engineers of Japan, Technical Paper OCS94-66, OPE94-88(1944-11), for example.

In the conventional method mentioned in the above, a characteristic curve of wavelength—optical power which is complex and variable in the shape thereof with respect to changes in an input power is made a constant or flat under a predetermined condition, thereby the characteristic curve in the gain is compensated under the predetermined condition.

Namely, an optical signal which is multiplexed with four waves in wavelengths of −11 dBm is inputted into an optical amplifier, and an optical output as a total of the amplified optical signal is monitored, wherein a fiber gain controller (it is called as "AFGC" hereinafter) for controlling fiber gain is used so as to make a level of that output a constant value. In this manner, the fiber gain can be controlled at the constant value of 12 dB, thereby minimizing the difference for each wavelength.

Or, by use of an automatic power controller (called as "APC" hereinafter) with an optical attenuator, optical loss is adjusted while maintaining the fiber gain at the constant value of 12 dB, thereby inhibiting the changes in spectrum of the fiber gain if the amplification factor of the in-line amplifier is changed.

SUMMARY OF THE INVENTION

In an actual application of the optical amplifier apparatus to the optical transmission system, it is conceivable that a transmission span length is not always constant. One example of such the application is explained with referring to FIG. 9.

FIGS. 9(a) shows a block diagram in a case when the optical amplifier apparatus is applied to the optical transmission system in which the transmission span is not constant. In the figure, a reference numeral 1 denotes an optical receiver, 2 an optical amplifier apparatus, 3 an optical multiplexer, 4a, 4b, 4c optical transmitters. The distance from the optical transmitter 4a to the optical multiplexer 3, that from the optical transmitter 4b to the optical multiplexer 3, and that from the optical transmitter 4c to the optical multiplexer 3 are different from one another.

As shown in FIG. 9(a), wavelength multiplexed transmission optical signals from the optical transmitter 4a, the optical transmitter 4b and the optical transmitter 4c, passing through the optical multiplexer 3, are amplified by the optical amplifier apparatus 2, thereafter they are distributed to the optical receiver 1.

As shown in FIG. 9(b), time bands, during which the wavelength multiplexed transmission optical signals from those optical transmitters 4a, 4b and 4c are distributed to the optical receiver 1, are pre-assigned, respectively. Namely, this shows a transmission method of so-called a time division multiplex (hereinafter, called as only "TDM"), in which the optical receiver 1 receives the optical signals in a time sequence from the predetermined one of the optical transmitters.

In the method mentioned in the above, the transmission distance from the optical transmitter to the optical amplifier apparatus is not constant, therefore, a level of the optical input at the optical amplifier is low, during the time band when the wavelength multiplexed optical signals from the optical transmitter at long transmission distance are distributed. On the contrary, during the time band when the wavelength multiplexed optical signals from the optical transmitter at the short transmission distance are distributed, the level of the optical input at the optical amplifier is high.

There is a drawback that it is necessary to apply an optical amplifier apparatus having a wide dynamic range for input, in order to achieve equal optical amplification for all of such the optical input signals.

Further, a system of such construction is also conceivable that a plurality of optical amplifiers are located at positions where they are not necessarily constant in the transmission span. If the transmission span differs, the span loss also differs, then the input level of the optical signals at the optical amplifier differs depending on the location where it is positioned. Therefore, there is a drawback that it is desired to apply an optical amplifier which possesses the input dynamic range being able to cope with any length of the transmission span, in order to construct a transmission system of high reliability with ease and with certainty.

However, the conventional art mentioned in the above has studied only the case where the input level is fixed at −11 dBm. And, in the method mentioned in the above conventional art, only if the dynamic range from −30 dBm to 0 dBm can be secured with respect to the input, for example, then the fiber gain is made constant at 12 dBm.

Therefore, the output level of the fiber changes from −18 dBm up to +12 dBm depending on the level of the signals. At this time, when the optical output is controlled at constant all over the input dynamic range by use of the APC, the optical output mentioned above must be below −18 dBm, i.e., about one-hundredth (1/100) of the ordinal optical transmission power, thereby causing a problem in practical use.

For dissolving such the problem as mentioned in above, it becomes a necessary object to increase the gain above 12 dB, however, in general, the optical fiber which is added with the rare-earth metal therein has such a problem, that the higher in the gain thereof, the more difficult to realize the flatness in wavelength. In the conventional method mentioned in the above, though it studied only the case of the small gain amplification of 12 dB, but it fails to study a method or countermeasure for ensuring a gain over 30 dB and for realizing the flatness in those wavelengths.

Furthermore, if the gain of the optical fiber is increased, a saturation is caused in the gain due to the characteristics of the optical fiber added with the rare-earth metal when the input signal becomes large, as far as the gain is controlled at constant as taught by the conventional method. Therefore, it is principally impossible for it to ensure the gain over 30 dB within the range of all the above-mentioned input dynamic range, after all, there is a problem that it is difficult to enlarge the input dynamic range.

Namely, the conventional art mentioned in the above is that which discloses only the characteristic within the extremely restricted condition, however, there are many problems to be solved upon application thereof to an actual system.

Further, the wavelengths, 1,548 nm, 1,551 nm, 1,554 nm and 1,557 nm, for examples, which are applied into the conventional method, are those wavelengths, within a region of which the flatness is realized relatively. However, in order to further enlarge the applicable region of wavelength over those, there is caused another problem that it is necessary to further enlarge the flattened region of the fiber itself.

Further, in totality of the optical amplifier apparatus, the optical attenuation, which comes to be the loss of the gain, deteriorates efficiency in amplification by the optical amplifier apparatus as a whole, or comes to be a factor of lessening noise index thereof. In the conventional example, though the optical attenuator is used, however, ill effect affected by the optical attenuation on the optical amplifier apparatus and a countermeasure therefor are not studied at all.

Moreover, as an general characteristic of the optical amplifier apparatus, it has already been known that a degree in the flatness for wavelengths is varied depending on a change in the number of the multiplexing of wavelengths. In the conventional art mentioned in the above, the wavelength flatness is studied when it is restricted to the multiplexing of four (4) wavelengths, however, there is a problem that no countermeasure for a case that the number of the wavelength multiplexing is changed has been studied.

An object is, in accordance with the present invention, for dissolving the drawbacks in the conventional art mentioned in the above, to provide an optical amplifier apparatus and a control method thereof, and an optical transmission system using the optical amplifier apparatus, having the wide input dynamic range, realizing the flatness in wavelengths of a large number of the optical signals, easily, with only a small number of active devices, suppressing deterioration in the amplification efficiency and the noise index corresponding to change in each wavelength and the number of the wavelength multiplexing, and realizing the wavelength flatness, automatically.

For achieving the above object, in accordance with the present invention, there is provided an optical amplifier apparatus, for amplifying inputted multiplexed optical signals, comprising:

optical adjusting means for adjusting the inputted multiplexed optical signals in optical power thereof with a certain characteristic of gain;

optical amplifying means for amplifying the optical power of the adjusted multiplexed optical signals with a characteristic of gain which is reversed to that of said adjusting means;

optical splitting means for splitting a part of the amplified multiplexed optical signals as an output optical signal and for splitting another part thereof as a detection optical signal;

optical signal detecting means for inputting said detection optical signal which is splitted; and a controller apparatus for controlling said adjusting means and said optical amplifying means upon an output from said optical signal detecting means, wherein an output gain characteristic in the optical power of said optical amplifying means is flatten at a predetermined value.

Further, in accordance with the present invention, there is provided an optical amplifier apparatus as defined in the above, wherein said adjusting means comprises: an splitting portion for splitting the inputted multiplexed optical signals into a plurality of optical signals of wavelength bands; a pumping light source having an optical splitting element for splitting an emitted pumping light; a plurality of multiplexers for multiplexing said plurality of split optical signals and said split pumping light; a plurality of optical fibers doped with rare-earth material, being different in amplification factors thereof; a plurality of optical band-pass filters for by-passing only the optical signal of a desired wavelength band among said multiplexed optical signals which are amplified; and an optical multiplexer for multiplexing the plurality of the optical signals of the wavelength bands by-passing said filers.

Further, in accordance with the present invention, there is provided an optical amplifier apparatus as defined in the above, wherein said optical amplifying means comprises: a pumping light source for emitting a pumping light; an optical multiplexer for multiplexing said inputted multiplexed optical signals and the pumping light from said pumping light source; and an optical fiber doped with rare-earth material for amplifying said multiplexed optical signals.

Further, in accordance with the present invention, there is also provided an optical amplifier apparatus as defined in the above, wherein said optical signal detecting means comprises: an optical splitting portion for splitting the split optical signals into two paths; a first optical signal detector connected to said dividing portion; and a second optical signal detector connected to said dividing portion through an optical band-pass filter for by-passing only the optical signal of a specific wavelength.

Further, in accordance with the present invention, there is provided an optical amplifier apparatus as defined in the above, wherein said controller apparatus comprises: a first controlling means for controlling said optical amplifier means upon a first monitor signal from said first optical detector; and a second controlling means for controlling said adjusting means upon the first monitor signal and a second monitor signal from said second optical detector.

Further, in accordance with the present invention, there is provided an optical amplifier apparatus as defined in the above, wherein said optical fiber doped with the rare-earth material is an Erbium doped optical fiber.

Further, in accordance with the present invention, there is provided an optical amplifier apparatus as defined in the above, wherein said first optical signal detector detects a total optical power of the optical signals of the plural wavelength bands to provide the first monitor signal, said second optical signal detector detects the optical power of the optical signal of the specific wavelength through the optical band-pass filter to provide the second monitor signal.

Further, in accordance with the present invention, there is provided an optical amplifier apparatus as defined in the above, wherein said first controlling means compares said first monitor signal to a reference voltage to control the pumping light source of said optical amplifier means with a comparison signal thereof, thereby adjusting a level of the wavelength characteristic in the gain of said optical amplifying means.

Further, in accordance with the present invention, there is provided an optical amplifier apparatus as defined in the above, wherein said second controlling means compares an average optical power of said plurality of the optical signals of wavelength band, which is obtained by dividing said first monitor signal and an optical power of the optical signal of the specific wavelength of said second monitor signal, thereby controlling the pumping light source of said adjusting means with the difference signal so as to adjust a level and an inclination of the characteristic in the gain of said optical amplifying means being reversed to the wavelength characteristic which is possessed by said adjusting means.

Further, in accordance with the present invention, there is provided an optical amplifier apparatus as defined in the above, wherein the optical band-pass filter of said adjusting means is positioned at a high gain end or a low gain end of the multiplexed optical signal.

Moreover, also for accomplishing the above object, in accordance with the present invention, there is provided a control method of an optical amplifier apparatus for compensating gain characteristic of an optical amplifying medium, wherein causing a gain characteristic being reversed to a characteristic in gain of said optical amplifying medium, thereby flattening the gain characteristic possessed by said optical amplifying medium at a predetermined value.

Further, in accordance with the present invention, there is provided a control method of an optical amplifier apparatus as defined in the above, wherein said reversed gain characteristic is changeable.

Further, in accordance with the present invention, there is provided a control method of an optical amplifier apparatus as defined in the above, further comprising steps of:

detecting a level of an optical output from the optical amplifying medium so as to control the gain characteristic thereof; and detecting flatness in the gain of the optical output so as to control said reversed gain characteristic.

Further, in accordance with the present invention, there is provided a control method of an optical amplifier apparatus as defined in the above, further comprising steps of:

detecting total optical power of a plurality of optical signals of an wavelength band, detecting optical power of only an optical signal of a specific wavelength by using an optical band-pass filter, and adjusting the gain characteristic value of the optical amplifying medium upon a comparison signal between said detected total optical power and a reference voltage; and adjusting a level and an inclination of said reversed gain characteristic by a comparison signal between the averaged optical power of the plurality of the optical signals of the wavelength band, which is obtained from said total optical power and the optical power of said optical signal of the specific wavelength.

In addition to the above, also for accomplish the above-mentioned object, in accordance with the present invention, there is further provided a multiplexed optical signal transmission system having a optical transmitter apparatus, an optical amplifier apparatus, an optical receiver apparatus and multiplex optical fibers connecting among those, wherein the optical amplification apparatus as defined in one of claims 1 through 5 is used therein, said optical amplifier apparatus is positioned at an after-stage of said multiplex optical fibers.

DESCRIPTION OF THE PREFERRED EMBODIMENTS

Hereinafter, detailed explanation of the embodiments of an optical transmission system using an optical amplifier apparatus and a control method thereof, in accordance with the present invention, will be given by referring to attached FIGS. 1 through 8.

First, before explaining construction of the present invention, an explanation of theoretical background is as follows.

Figure 1:
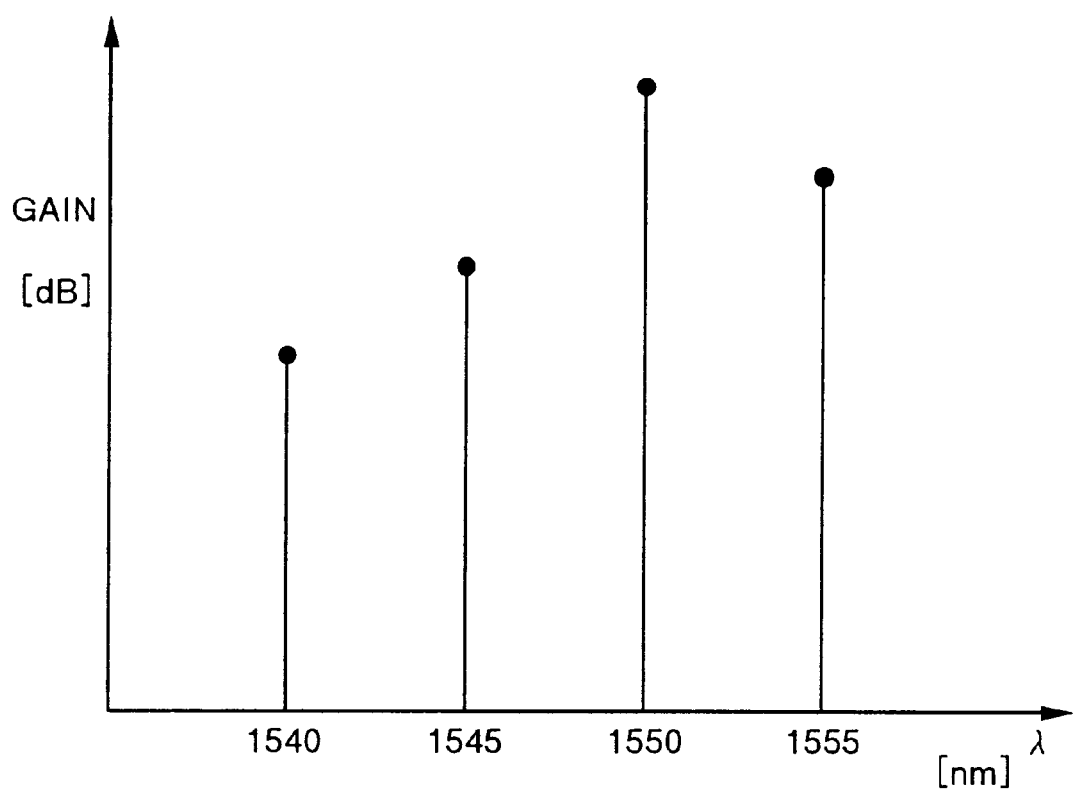
FIG. 1 is a graph showing dependency upon wavelengths in a gain characteristic of an Erbium doped optical fiber as an optical amplifier.
Figure 2A:
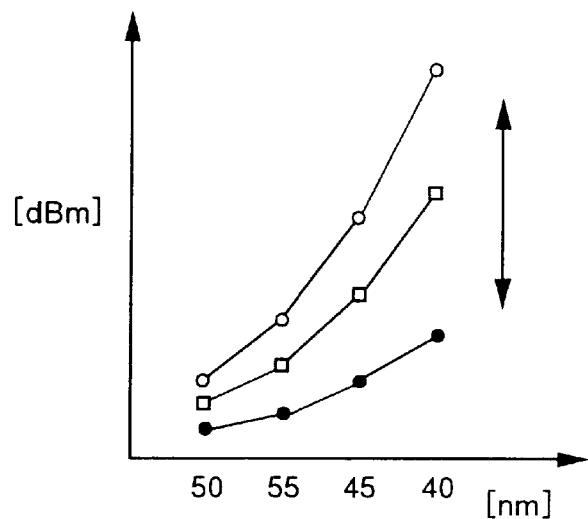
FIGS. 2(a) through (c) are also graphs showing characteristics of the wavelength dependencies of all elements in the optical amplifier apparatus, in accordance with an embodiment of the present invention.
Figure 2B:
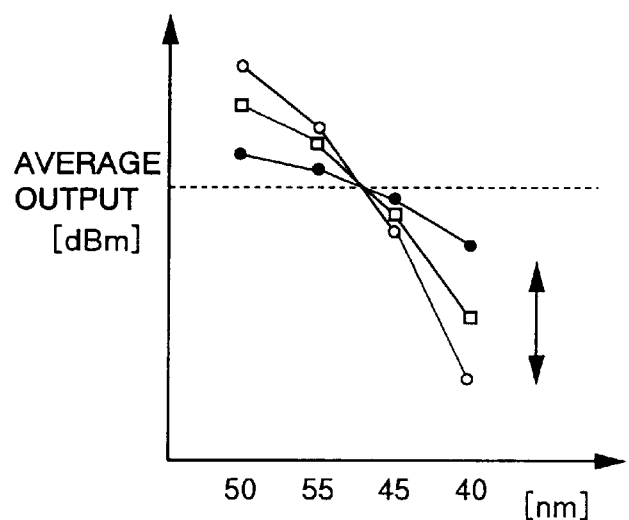
Figure 2C:
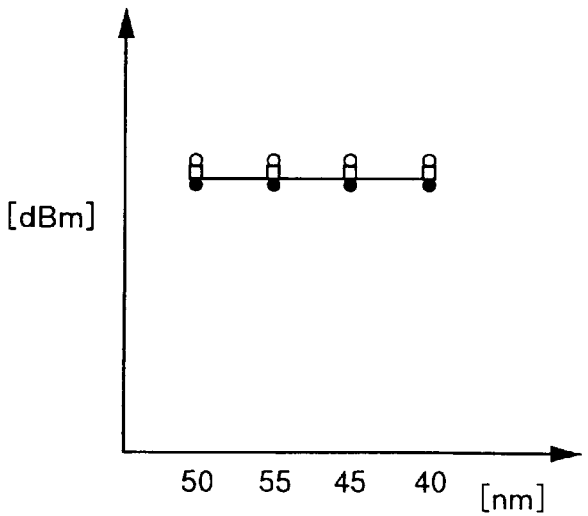

FIG. 1 is a graph showing dependency upon wavelengths in a gain characteristic of an Erbium doped optical fiber as an optical amplifier, and FIGS. 2(a) through (c) are also graphs showing characteristics of the wavelength dependencies of all elements in the optical amplifier apparatus, in accordance with an embodiment of the present invention.

In FIG. 1, there are denoted the gains for various wavelengths, i.e., four (4) wavelengths, 1,540 nm, 1,545 nm, 1,550 nm and 1,555 nm, of optical signals in the Erbium doped optical fiber which is applied as the optical amplifying medium.

Generally speaking, wavelength band which can be amplified with the Erbium doped optical fiber lies from 1,520 nm to 1,570 nm, however, the gain characteristic in this wavelength band shows the dependency upon the wavelength. Further, the wavelength dependency is also changed depending on the gain of the optical signals or on an input power of the optical signals.

However, in FIGS. 2(a) through (c), for simplifying the explanation, the gain for each of the four wavelengths of the optical signals, 1,540 nm, 1,545 nm, 1,550 nm and 1,555 nm, is re-arranged and dotted from the left-hand side in an order of magnitude, i.e., 1,555 nm, 1,550 nm, 1,545 nm and 1,540 nm, and for respective elements, i.e., an optical adjuster, an optical amplifier, and an optical amplifier apparatus.

As mentioned in the above, the flatness of the optical signals amplified by the optical amplifier varies depending on increase and/or decrease in the gain of the optical signals and in the power of the inputted optical signals.

For instance, in the optical amplifier, as shown in FIG. 2(b), under condition that an average power of optical output signal is constant, when the inputted optical signal decreases in the power thereof, the gain characteristic curves for the respective wavelengths of the optical signal are shifted down in a direction shown by an arrow in the drawing, while when it increases in the power thereof, the gain characteristic curves are shifted up in a direction of the arrow in the drawing.

Noticing such theoretical background, in accordance with the present invention, the optical amplifier apparatus comprises: an optical amplifier only for adjusting the magnitude in the wavelength characteristic of the gain as shown in FIG. 2(b); and an optical adjuster having a relationship in magnitude thereof as shown in FIG. 2(a), which is reversed to the wavelength characteristic of the gain as shown in FIG. 2(b), and for adjusting an inclination in the wavelength characteristic of the gain with ease.

The optical adjuster mentioned above increases the inclination when optical output level varies into a direction (upper direction) of the arrow shown in FIG. 2(a), on the contrary to this, it decreases the inclination when the optical output level varies into the direction (down direction) of the arrow shown in FIG. 2(b).

Accordingly, as shown in FIG. 2(c), the optical signal passing through the optical adjuster and the optical amplifier comes to show an equal gain for the respective wavelengths, thereby optical output of all the wavelengths are adjusted at constant.

Further, when a change occurs in the gain characteristic shown in FIG. 2(b) in the optical amplifier, the gain characteristic of the optical adjuster is changed correspondingly, and as a result, thereby controlling and adjusting so as to obtain the equal gain for every wavelength as shown in FIG. 2(c).

By referring to FIG. 3, the input and output levels of the optical signal at the respective elements will be explained hereinafter.

Figure 3:
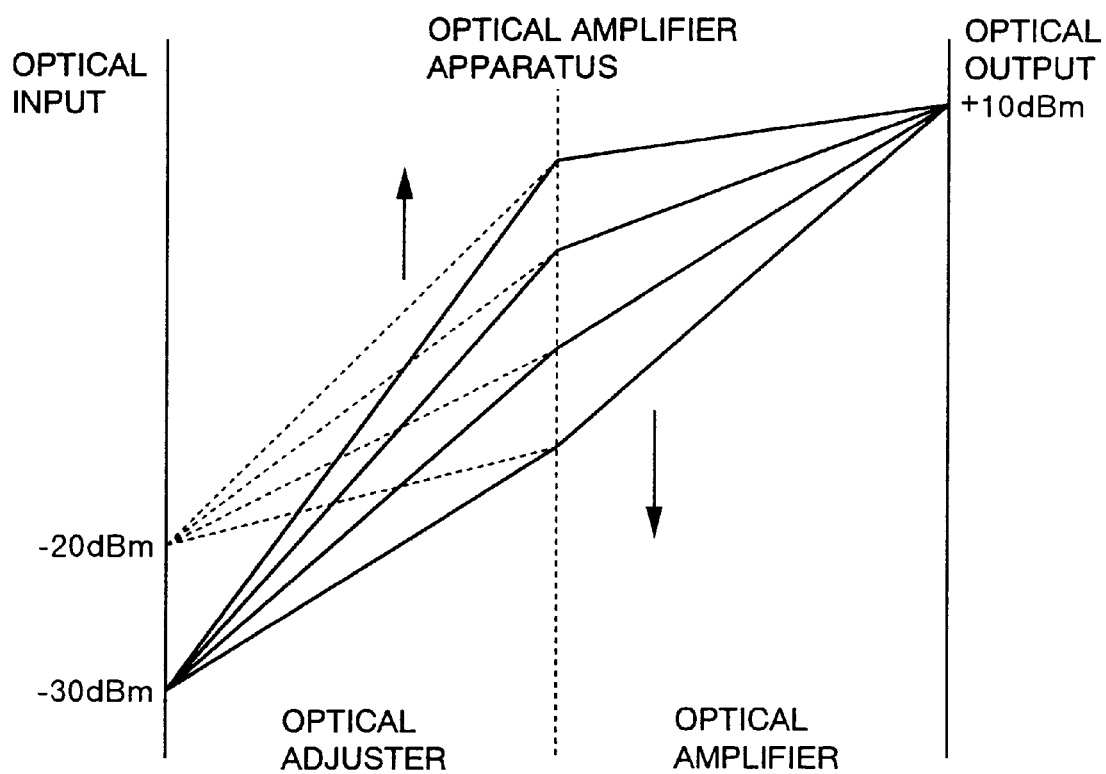
FIG. 3 shows the input and output levels of the optical signal at an optical adjuster and at the optical amplifier in accordance with the present invention.

FIG. 3 shows the input and output levels of the optical signal at the optical adjuster and at the optical amplifier in accordance with the present invention.

As is mentioned in the above, in order to obtain a constant output for all wavelengths, in the figure, since the optical amplifier has a characteristic of increasing the inclination when the optical input level decreases down in a direction of the arrow (down direction), as shown in a half of the right-hand side of FIG. 3, therefore, on the contrary to this, the optical adjuster must have a characteristics of increasing the inclination when the optical input level rises up in a direction of the arrow (upper direction), as shown in the left-hand side half of FIG. 3.

By providing such the characteristics as mentioned in he above with the optical adjuster, the input level at the optical amplifier, i.e., the optical output level of the optical adjuster, is determined unconditionally so as to flatten the gain of the optical amplifier apparatus.

As a result, by controlling the optical adjuster and the optical amplifier, it is possible to settle the inputted optical signals of all the dynamic range of the inputs into a predetermined value of stable and flat, unconditionally.

Next, by referring to FIG. 4, a concrete construction of the optical amplifier apparatus, in accordance with an embodiment of the present invention, will be explained.

Figure 4:
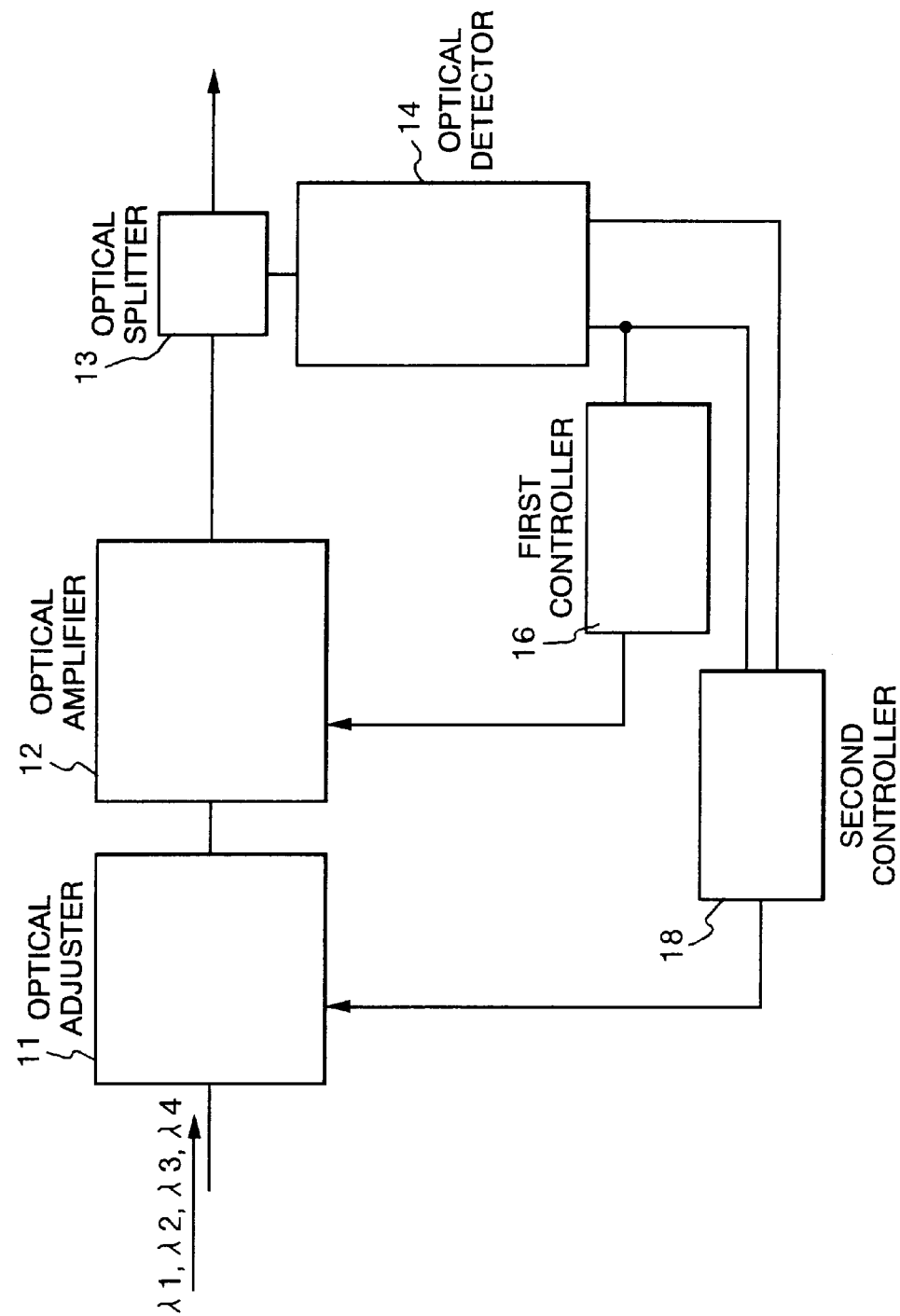
FIG. 4 is a block diagram of the optical amplifier apparatus in accordance with an embodiment of the present invention.

FIG. 4 is a block diagram of the optical amplifier apparatus in accordance with an embodiment of the present invention.

As shown in FIG. 4, the optical signals from a transmission fiber are transmitted in a single optical fiber, for example, by multiplexing four wavelengths, i.e., 1,540 nm, 1,545 nm, 1,550 nm and 1,555 nm.

The transmitted optical signals mentioned in the above, after being introduced into the optical adjuster 11, are adjusted in optical power for each optical signal and led to the optical amplifier 12. In the optical amplifier 12 mentioned in the above, the optical signals of the respective wavelengths are amplified together and outputted as an optical output. The optical output led out from the above-mentioned optical amplifier 12, i.e., the multiplexed optical output is outputted from an optical splitter 13 as the optical output, and a part of which is split or divided therefrom.

The split optical output mentioned in the above is detected by optical detector 14. Upon the detected optical signal mentioned above, the optical amplifier 12 and the optical adjuster 11 are controlled in such a manner that the amplified multiplexed optical output is at a predetermined value with maintaining the wavelength flatness through a first controller 16 and a second controller 18.

The optical amplifier apparatus shown in FIG. 4 will be explained in more detail hereinafter.

Figure 5:
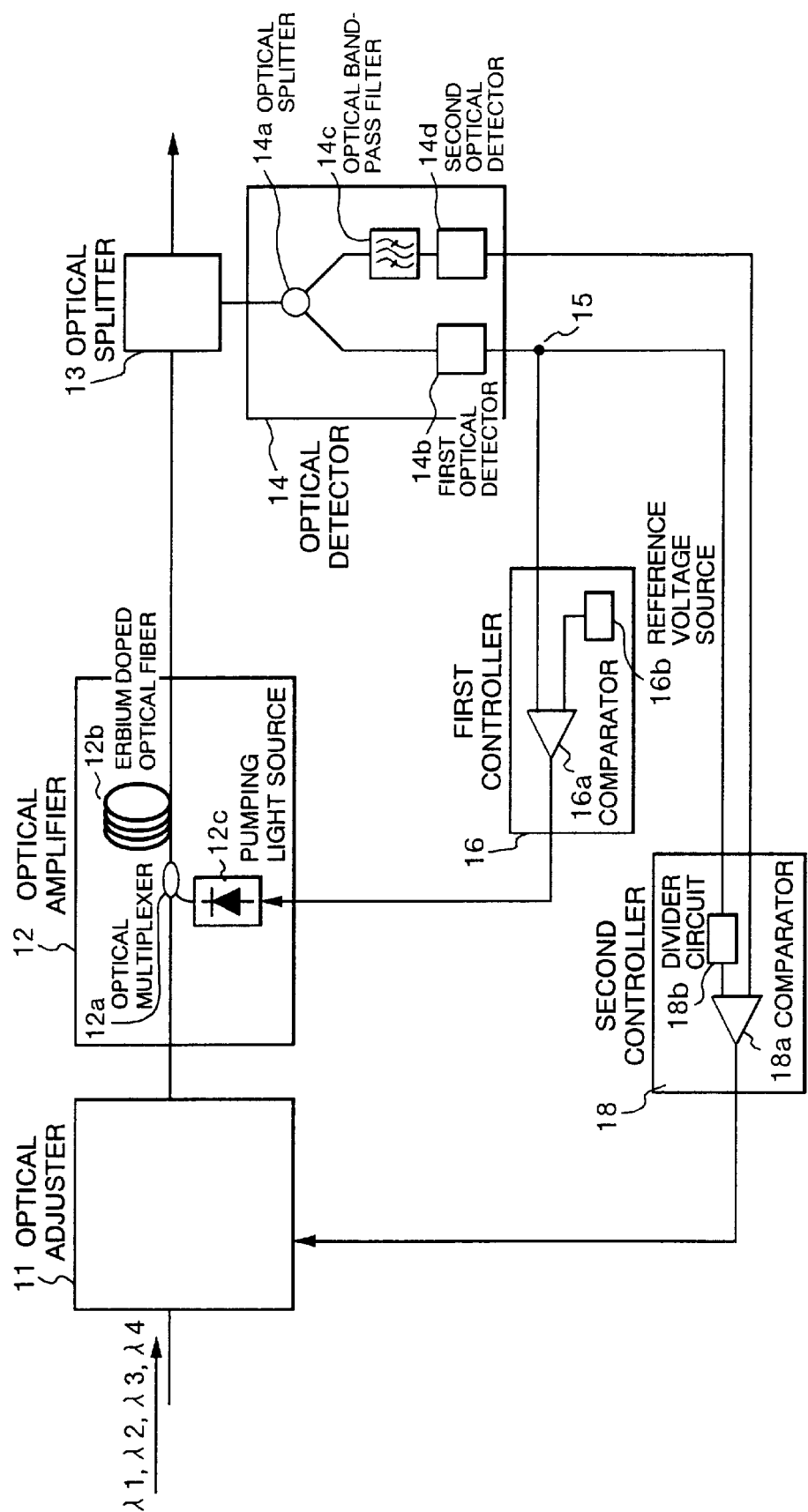
FIG. 5 is a block diagram of the concrete construction of the optical amplifier apparatus shown in FIG. 4.

FIG. 5 is a block diagram of the concrete construction of the optical amplifier apparatus shown in FIG. 4.

In FIG. 5, the four wavelength multiplexed signals which are transmitted, after being introduced into the optical adjuster 11, are adjusted in the optical power for each optical signal thereof to be injected into the optical amplifier 12.

The optical amplifier 12 is constructed with an optical multiplexer 12a, an Erbium doped optical fiber 12b connected in series thereto, and a pumping light source 12c for injecting a pumping light into the optical multiplexer 12a.

An injected light into the optical amplifier 12 is introduced into the Erbium doped optical fiber 12b passing through the optical multiplexer 12a. Further, as mentioned in the above, since to the optical multiplexer 12a is introduced the pumping light from the pumping light source 12c, the pumping light is also introduced into the Erbium doped optical fiber 12b so as to pump up it therewith.

The multiplexed optical signals $\lambda_1$, $\lambda_2$, $\lambda_3$ and $\lambda_4$, after being amplified by the Erbium doped optical fiber 12b in exited condition, are led out from the optical amplifier 12. A part of the optical output led out from the optical amplifier 12 is split or divided by the optical splitter 13, and the split optical output is detected by the optical detector 14.

The optical detector 14 mentioned above is constructed with an optical splitter 14a, a first optical detector 14b connected with the optical splitter 14a, and a second optical detector 14d connected through an optical band-pass filter 14c with the optical splitter 14a. The detected light which is detected by the first optical detector 14b is split or divided by a coupler 15 into two optical output signals, and the detected light which is detected by the second optical detector 14d is provided as the output signal.

Further explaining in more detail, being divided into the lights on two paths by the optical splitter 14a constructed by an optical coupler, etc., for example, the light on one path is taken into the first optical detector 14b so as to monitor total optical power of the optical output, and it is sent out from the first optical detector 14b to the first controlling apparatus 16 and the second controlling apparatus 18 as a first monitor signal.

Further, the split light on the other path is taken into the second optical detector 14d through the optical band-pass filter 14c for by-passing only the light of wavelength 1,540 nm, for example. Thereby, it is possible to monitor the level of only one of the wavelength of the multiplexed optical signals inputted, i.e., the signal of $\lambda_1$=1,540 nm among these signals of $\lambda_1$=1,540 nm, $\lambda_2$=1,540 nm, $\lambda_3$=1,540 nm, and $\lambda_4$=1,540 nm, and it is sent out to the second controller 18 as the second monitor signal.

The first controller 16 is constructed with a comparator 16a and a reference voltage source 16b, in which, the comparator 16a compares the first monitor signal from the first optical detector 14b and a predetermined reference value signal from the reference voltage source 16b so as to detect a difference signal therebetween.

The difference signal detected by the comparator 16a mentioned in above is transmitted to the pumping light source 12c so as to execute a feed-back control, thereby controlling the optical output at constant in the total power thereof.

Thereby, it is possible for the optical amplifier 12 to amplify the optical output at the constant value in the total power thereof.

Next, the second controller 18 is constructed with a comparator 18a and a divider circuit 18b, in which, the comparator 18a can detect an average optical power for each single wavelength by dividing the first monitor signal from the first optical detector 14b by the number of the wavelengths through the divider circuit 18b. Further, the second monitor signal from the second optical detector 14d is taken into the comparator 18a mentioned in the above.

Next, in the comparator 18a, the average optical power for the each single wavelength which is obtained by dividing the first monitor signal by the number of the wavelengths through the divider circuit 18b, and the optical power of the specific wavelength of the second monitor signal which is taken therein, are compared so as to obtain a relationship between the magnitude and the difference thereof.

In the comparator 18a mentioned in above, when the difference signal is positive, the optical adjuster 11 is controlled depending on the magnitude of the difference signal so as to shift the gain in the upper direction shown by the arrow in FIG. 2(a).

In the comparator 18a mentioned in above, when the difference signal is negative, the optical adjuster 11 is controlled depending on the magnitude of the difference signal so as to shift the gain in the lower direction shown by the arrow in FIG. 2(a).

With such the construction, if the optical power, which is detected by the second optical detector 14d with respect to the average optical power for each single wavelength, such as for 1,540 nm, is low, the inclination can be compensated as shown in FIG. 2(c), by shifting the gain of the optical adjuster 11 in the upper direction in FIG. 2(a), on the contrary, if the optical power for 1,540 nm is high, the inclination can be compensated as shown in FIG. 2(c), by shifting the gain of the optical adjuster 11 in the lower direction as shown in FIG. 2(a).

In this case, for the purpose of significantly appealing in the inclination, it is preferable that the wavelength to be selected is that which is shown at the most left-hand or right-hand side in each of drawing of FIGS. 2(a) through (c), especially, the wavelength of 1,550 nm or 1,540 nm is desirable in FIGS. 2(a) through (c).

Next, an embodiment of the optical adjuster 1 will be explained by referring to FIG. 6 hereinafter.

Figure 6:
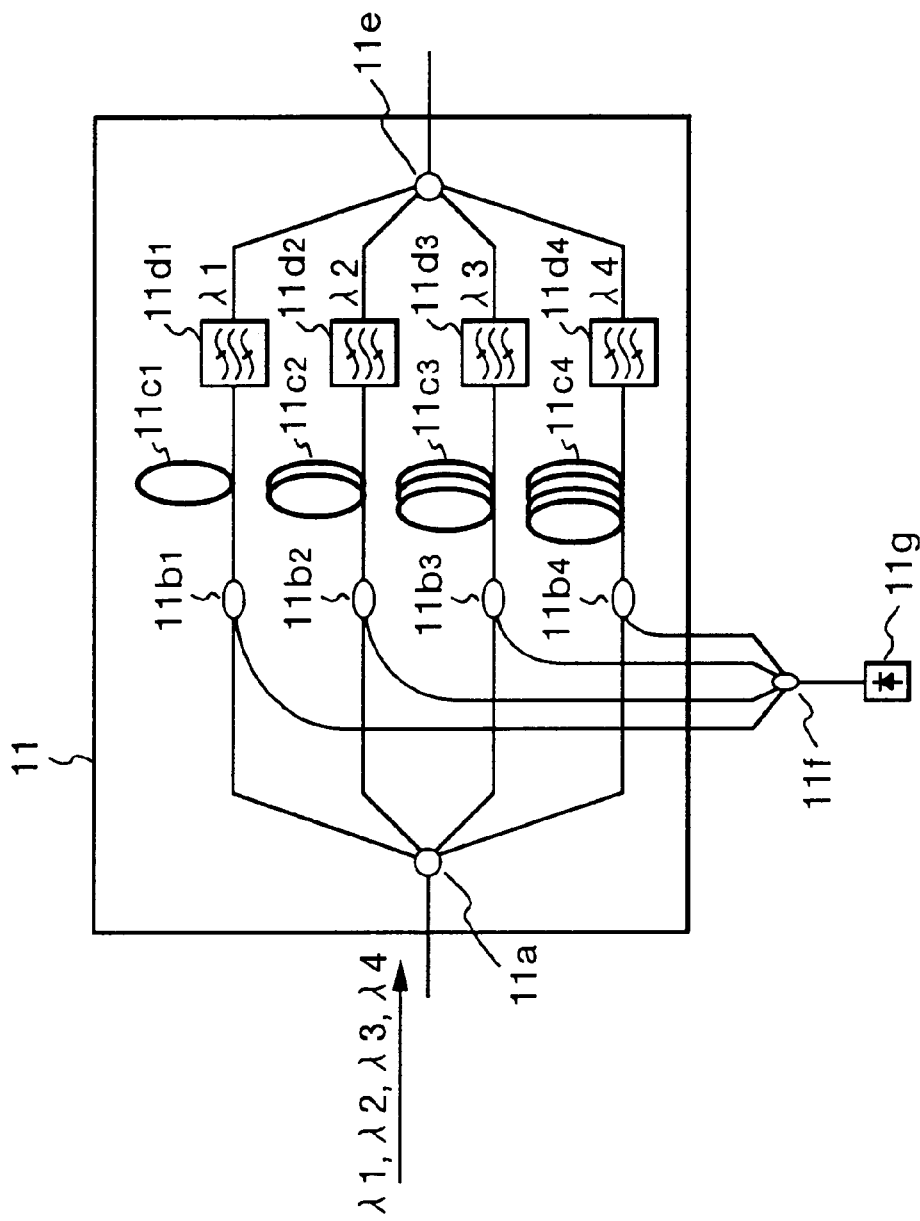
FIG. 6 is an explanatory view of the optical adjuster of the amplifier apparatus in accordance with the present invention.

FIG. 6 is an explanatory view of the optical adjuster of the amplifier apparatus in accordance with the present invention.

As shown in the figure, the optical adjuster 11 is constructed with: an optical coupler 11a for splitting or dividing the multiplexed input signals; a pumping light source 11g for emitting a pumping light; optical multiplexers $11b_1$, $11b_2$, $11b_3$ and $11b_4$ for multiplexing the split multiplexed input signals with the pumping light; Erbium doped optical fibers $11c_1$, $11c_2$, $11c_3$ and $11c_4$ for amplifying the multiplexed optical signals, respectively, each of which has different amplification gain from one other; and an optical coupler 11e for coupling the amplified optical signals from the Erbium doped optical fibers $11c_1$, $11c_2$, $11c_3$ and $11c_4$.

The multiplexed input optical signals of wavelengths, $\lambda_1$, $\lambda_2$, $\lambda_3$, and $\lambda_4$ are split or divided into the four paths. The split optical signals divided into the above-mentioned four paths and the pumping light from the pumping light source 11e are led into the respective Erbium doped optical fibers $11c_1$, $11c_2$, $11c_3$ and $11c_4$ through the respective optical multiplexers $11b_1$, $11b_2$, $11b_3$ and $11b_4$, each of which has the amplification gain being different from one another.

The multiplexed optical signals, which are amplified by the above-mentioned Erbium doped optical fibers $11c_1$, $11c_2$, $11c_3$ and $11c_4$, respectively, are led to the respective optical band-pass filters $11d_1$, $11d_2$, $11d_3$ and $11d_4$, through each of which can pass only an optical signal of desired wavelength band.

The wavelength band for each of the optical band-pass filters which are used in the present embodiment is 6 nm, for example. The optical signals passing through the optical filters are multiplexed again by the optical coupler 11e to be outputted therefrom.

Further, the pumping light of wavelength 0.98 μm from the pumping light source 11g, after being split by the optical coupler 11f, is introduced, through the respective optical multiplexers $11b_1$, $11b_2$, $11b_3$ and $11b_4$, into the respective Erbium doped optical fibers $11c_1$, $11c_2$, $11c_3$ and $11c_4$ forming respective paths thereof.

The above-mentioned pumping light is almost equally split or divided, on the contrary to this, a setting condition of those Erbium doped optical fibers $11c_1$, $11c_2$, $11c_3$ and $11c_4$ which provided in the respective paths will be explained by referring to FIGS. 7(a) through (e), hereinafter.

FIGS. 7(a) through (e) show characteristic curves with respect to the gain of the Erbium doped optical fiber and the length thereof, with taking the pumping power as parameters therefor.

Figure 7A:
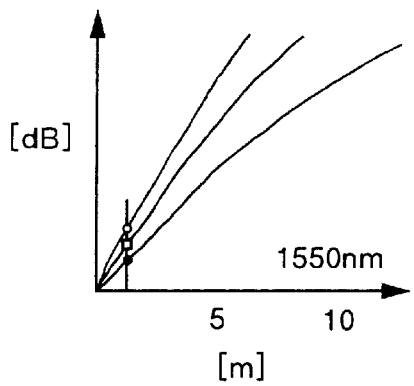
FIGS. 7(a) through (e) show characteristic curves with respect to the gain of the Erbium doped optical fiber and the length thereof, with taking the pumping power as parameters therefor.

FIG. 7(a) shows a graph of plotting the relationship between the length of the Erbium doped optical fiber and the gain thereof, with respect to the wavelength of 1,550 nm while changing the pumping power.

Figure 7B:
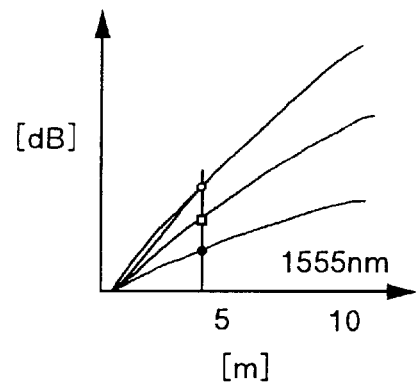
Figure 7C:
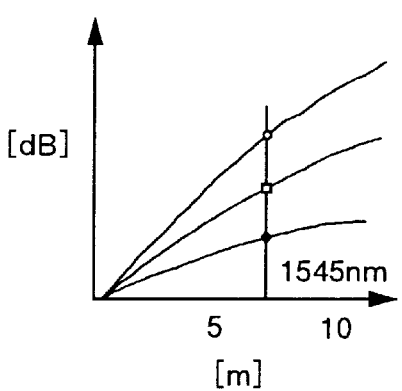
Figure 7D:
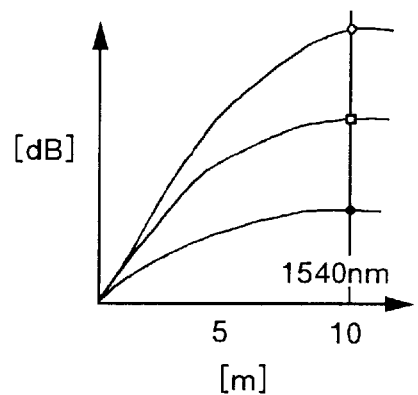

In the same manner, FIG. 7(b), FIG. 7(c) and FIG. 7(c) show those with wavelength of 1,555 nm, 1,545 nm and 1,540 nm, respectively. Further, FIG. 7(e) shows the gain for each wavelength when the length of the Erbium doped optical fiber is set in such manner that the gain for the each wavelength comes to be the wavelength characteristic which is opposing or reversed to that of the Erbium doped optical fiber functioning as the optical amplifier, and it is fundamentally the same graph as shown in FIG. 2(a).

As be apparent from those graphs, by constructing it in such the manner of the present embodiment mentioned in the above, the optical adjuster having the opposing or reversed characteristic to that of the optical amplifier can be constructed easily, and it is also possible to adjust the inclination by adjusting only the optical power of the pumping light from the only one source thereof.

Figure 7E:
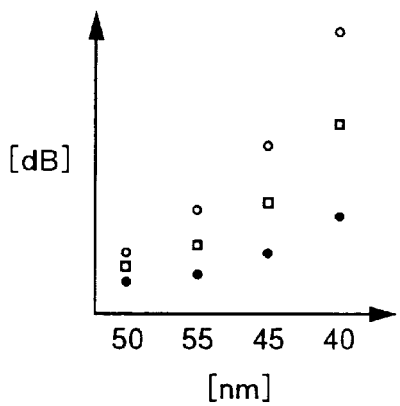

A method for setting the Erbium doped optical fiber so that it provides such the gain characteristics as shown in the graph of FIG. 7(e) will be explained, hereinafter. First, a light source is prepared, by which the optical powers of the four wavelengths 1,540 nm, 1,545 nm, 1,550 nm and 1,555 nm can be changed independently. Those optical signals from this are inputted into the optical amplifier as the wavelength multiplexed signals.

It is preferable that the input level of this is located in a vicinity of a center of a predictable level thereof. The optical powers of the respective light sources are controlled or adjusted so that the optical output of the optical amplifier is controlled at a desired power and the flatness can be obtained therewith. The adjusted optical powers of the light sources are measured, respectively.

Next, the wavelength multiplexed optical signals are set so that they has the optical power in the vicinity of the center in the dynamic range at the input to the amplifier apparatus of the present invention and achieves the flatness. The wavelength multiplexed optical signals are inputted to the optical adjustier of the present embodiment of the present invention, and the pumping light power is set at in the vicinity of a center of the adjustable range, for instance at 20 mW for each. The lengths of the Erbium doped optical fibers are adjusted and set so that the signal level which is measured can be obtained for each wavelength.

It is preferable that the length is set at a little bit longer previously, and that it is seized to be connected while being cut at appropriate length by using a machinery, such as a fiber seizing apparatus. By doing so, it is possible to set the lengths of the Erbium doped optical fibers in the optical adjuster, easily.

In the present embodiment, though it is explained that the gain is changed by the length of the Erbium doped optical fiber, however, it is also possible to adjust the amplification factor by an amount of the rare-earth material, Erbium, which is added therein.

The characteristic of the optical amplifier apparatus can be also indicated by a noise index. In general, if the Erbium doped optical fiber is too long with respect to the wavelength showing high efficiency in amplification thereof, it has a tendency that the noise index is deteriorated. In accordance with the optical adjuster of the present embodiment, as is apparent from FIG. 7, since the fiber for the wavelengths of the high amplification efficiency are shorten, they have an effect that the noise indexes for the respective wavelengths are suppressed.

Furthermore, since such the optical attenuator as used in the conventional art is not used, it is possible to do the adjustment while amplifying, no deterioration occurs in the efficiency in the gain of the optical amplifier as a whole, and in the noise index.

Further, in accordance with the optical adjuster of the present embodiment, even if the number of the wavelength multiplexing is changed during the operation of the optical amplifier apparatus, it is possible to continue the control for realizing the flatness.

By doing so, being different from that the plurality of the optical amplifiers are provided and the pumping light sources thereof are adjusted as taught in the conventional art, it is possible to control the level of any wavelength multiplexed optical signal, by only adjusting the single optical amplifier and the pumping light source thereof.

Further, the number of the wavelength multiplexed optical signals is four (4) in the present embodiment, however, it can be any number other than that. In that case, it can be cope with by increasing the number of the optical splitters.

Actually, there can be a wavelength band in which the inclination hardly change even if the input level is changed. In such the case, it is no trouble to reduce the number of the optical splitters by combining the wavelengths in the band as one path. Further, in that case, by passing them through the optical filter for adjusting the inclination in the wavelengths which are combined as the one path, it is possible to realize the flatness in the wavelengths. The optical amplifier and the optical adjuster can be reversed in the positional relationships thereof.

Moreover, in the present embodiment mentioned in the above, it is explained that the optical output is controlled at constant, however, it causes no trouble to control the gain at constant, or to it is embodied in such form that the optical power of the pumping light or the pumping current is controlled at constant. In those cases, no problem occurs if the first controller apparatus controls the gain at constant or controls the pumping light source.

Figure 9A:
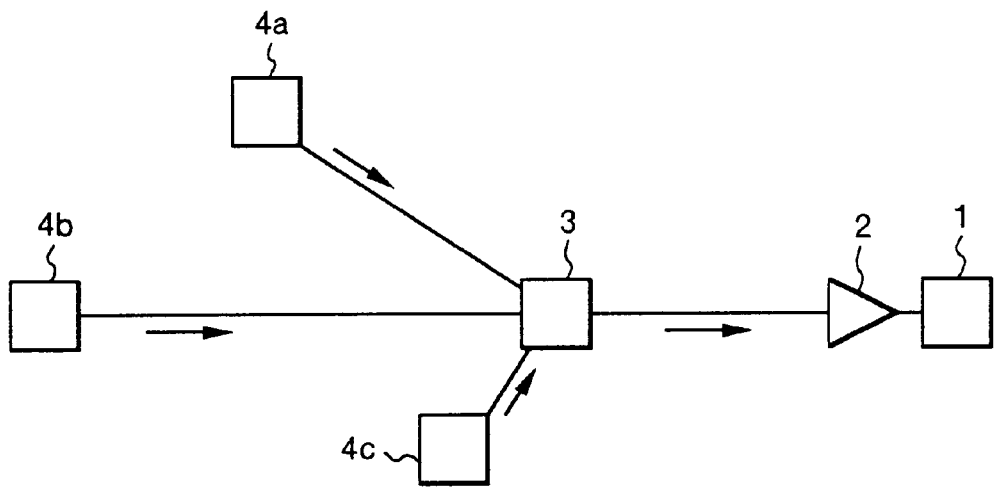
FIGS. 9(a) and (b) show a block diagram in a case when the optical amplifier apparatus is applied to the optical transmission system in which the transmission span is not constant and wavelength multiplexed transmission optical signals amplified there by in time bands.
Figure 9B:
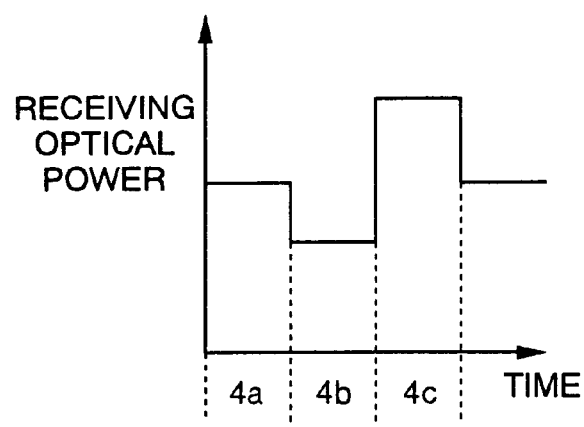

Next, an explanation will be given on a case in which the optical amplifier apparatus in accordance with an embodiment of the present invention is applied to an optical transmission system. FIG. 9 shows a block diagram of the optical transmission system using the optical amplifier apparatus in accordance with the embodiment of the present invention, in which the length of transmission spans are not constant. It is characterized in that the optical amplifier apparatus 2 having the wide input dynamic range, in accordance with an embodiment of the present invention, is positioned in a pre-stage of the optical receiving apparatus 1, thereby, as mentioned in the above, it is possible to construct the optical transmission system of TDM having a high reliability and a wide applicability, easily. In place of this, the optical amplifier apparatus 2 can be positioned at an after-stage of the optical multiplexer 3.

Further, by referring to FIG. 8, an explanation will be given on another case in which the optical amplifier apparatus in accordance with an embodiment of the present invention is applied to an optical transmission system, in which the transmission spans are also not constant in the length thereof.

Figure 8:
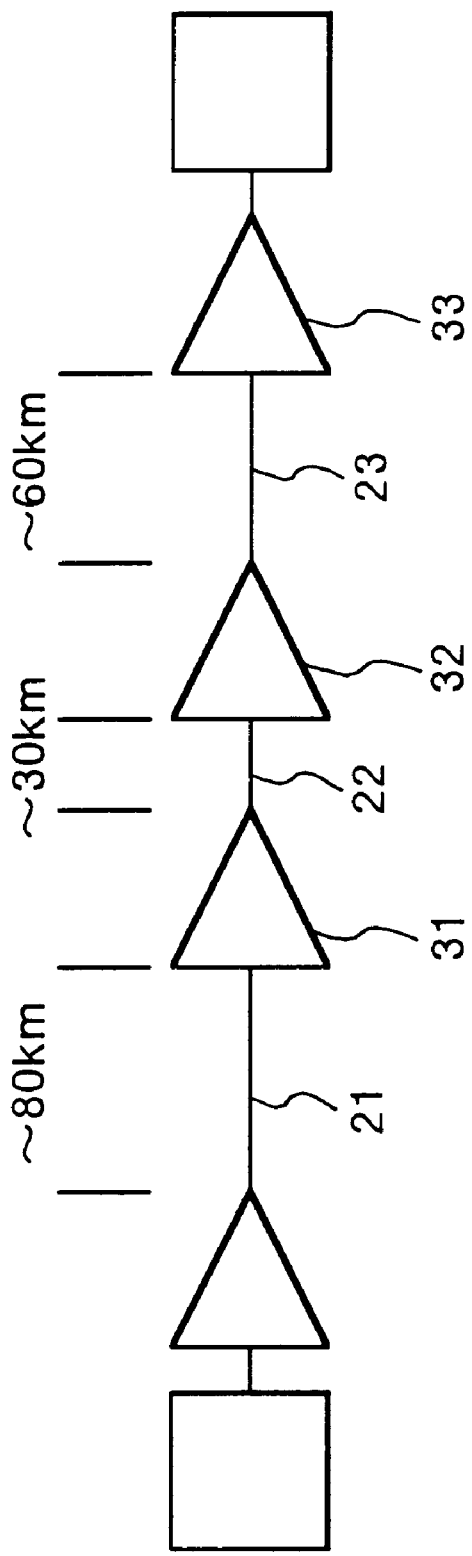
FIG. 8 shows a block diagram of another optical transmission system but also using the optical amplifier apparatus in accordance with the embodiment of the present invention, in which the lengths of transmission spans are not constant.

FIG. 8 shows a block diagram of another optical transmission system but also using the optical amplifier apparatus in accordance with the embodiment of the present invention, in which the lengths of transmission spans are not constant.

In the figure, the optical transmitter apparatuses have optical transmission fibers of different span lengths, respectively, i.e., 80 km, 30 km, and 60 km, and the optical amplifier apparatuses are indicated by reference numerals 31, 32 and 33, respectively.

The present optical transmission system is characterized in that they are positioned at after-stage in transmission direction of the optical transmission fibers 21, 22 and 23, respectively.

Corresponding to the difference in the span loss due to the fact that the optical transmission fibers 21, 22 and 23 are different in the span length thereof and the difference in the input level of signals, it is so constructed that the optical amplifier apparatus having the wide dynamic input range is positioned at the after-stage of each of the optical transmission fibers, thereby, it is possible to realize the flatness in wavelengths in each optical amplifier apparatus, as well as to send out a stable optical output, and is also possible to increase the reliability of the optical transmission system.

As is fully explained in the above, in accordance with the construction of the present invention, for dissolving the problems in the conventional arts, it is possible to provide an optical amplifier apparatus and a control method thereof, and an optical transmission system using the optical amplifier apparatus, having the wide input dynamic range, realizing the flatness in wavelengths of a large number of the optical signals, easily, with only a small number of active devices, suppressing deterioration in the amplification efficiency and the noise index corresponding to change in each wavelength and the number of the wavelength multiplexing, and realizing the wavelength flatness, automatically.

What is claimed is:

1. An optical amplifier apparatus, for amplifying inputted multiplexed optical signals, comprising:

optical adjusting means for adjusting the inputted multiplexed optical signals in optical power thereof with a certain characteristic of gain;

optical amplifying means for amplifying the optical power of the adjusted multiplexed optical signals with a characteristic of gain which is reversed to that of said adjusting means;

optical splitting means for splitting a part of the amplified multiplexed optical signals as an output optical signal and for splitting another part thereof as a detection optical signal;

optical signal detecting means for inputting said detection optical signal which is split; and a controller apparatus for controlling said adjusting means and said optical amplifying means upon an output from said optical signal detecting means, wherein an output gain characteristic in the optical power of the optical apparatus is flattened at a predetermined value.

2. An optical amplifier apparatus as defined in claim 1, wherein said adjusting means comprises: an optical splitting portion for splitting the inputted multiplexed optical signals into a plurality of optical signals of wavelength bands; a pumping light source having an optical splitting element for splitting an emitted pumping light; plurality of multiplexers for multiplexing said plurality of split optical signals and said split pumping light; a plurality of optical fibers doped with rare-earth material, being different in amplification factors thereof; a plurality of optical band-pass filters for by-passing only the optical signal of a desired wavelength band among said multiplexed optical signals which are amplified; and an optical multiplexer for multiplexing the plurality of the optical signals of the wavelength bands by-passing said filers.

3. An optical amplifier apparatus as defined in claim 1, wherein said optical amplifying means comprises: a pumping light source for emitting a pumping light; an optical multiplexer for multiplexing said inputted multiplexed optical signals and the pumping light from said pumping light source; and an optical fiber doped with rare-earth material for amplifying said multiplexed optical signals.

4. An optical amplifier apparatus as defined in claim 1, wherein said optical signal detecting means comprises: a splitting portion for splitting the split optical signals into two paths; a first optical signal detector connected to said splitting portion; and a second optical signal detector connected to said splitting portion through an optical band-pass filter for by-passing only the optical signal of a specific wavelength.

5. An optical amplifier apparatus as defined in claim 1, wherein said controller apparatus comprises: a first controlling means for controlling said optical amplifier means in accordance with a first monitor signal from said first optical detector; and a second controlling means for controlling said adjusting means in accordance with the first monitor signal and a second monitor signal from said second optical detector.

6. An optical amplifier apparatus as defined in claim 3, wherein said optical fiber doped with the rare-earth material is an Erbium doped optical fiber.

7. An optical amplifier apparatus as defined in claim 4, wherein said first optical signal detector detects a total optical power of the optical signals of the plural wavelength bands to provide a first monitor signal, said second optical signal detector detects the optical power of the optical signal of the specific wavelength through the optical band-pass filter to provide a second monitor signal.

8. An optical amplifier apparatus as defined in claim 5, wherein said first controlling means compares said first monitor signal to a reference voltage to control the pumping light source of said optical amplifier means with a comparison signal thereof, thereby adjusting a level of the wavelength characteristic in the gain of said optical amplifying means.

9. An optical amplifier apparatus as defined in claim 5, wherein said second controlling means compares an average optical power of said plurality of the optical signals of wavelength band, which is obtained by dividing said first monitor signal and an optical power of the optical signal of the specific wavelength of said second monitor signal, thereby controlling the pumping light source of said adjusting means with the difference signal so as to adjust a level and an inclination of the characteristic in the gain of said optical amplifying means being reversed to the wavelength characteristic which is possessed by said adjusting means.

10. An optical amplifier apparatus as defined in claim 2, wherein the optical band-pass filter of said adjusting means is positioned at a high gain end or a low gain end of the multiplexed optical signal.

11. A control method of an optical amplifier apparatus for compensating a gain characteristic of an optical amplifying medium comprising the steps of:

causing a gain characteristic which is reversed to a characteristic in gain of said optical amplifying medium;

flattening the gain characteristic possessed by said optical amplifier apparatus at a predetermined value;

detecting total optical power of a plurality of optical signals of an wavelength band, detecting optical power of only an optical signal of a specific wavelength by using an optical band-pass filter, and adjusting the gain characteristic value of the optical amplifying medium upon a comparison signal between said detected total optical power and a reference voltage; and adjusting a level and an inclination of said reversed gain characteristic by a comparison signal between the averaged optical power of the plurality of the optical signals of the wavelength band, which is obtained from said total optical power and the optical power of said optical signal of the specific wavelength.

12. A multiplexed optical signal transmission system having a optical transmitter apparatus, an optical amplifier apparatus, an optical receiver apparatus and multiplex optical fibers connecting among those, wherein the optical amplification apparatus as defined in one of claims 1 through 5 is used therein, said optical amplifier apparatus is positioned at an after-stage of said multiplex optical fibers.

13. An optical amplifier apparatus as defined in claim 1, wherein the inputted multiplexed optical signals have different wavelengths and the output gain characteristic in the optical power of the optical amplifier apparatus is substantially independent of wavelength at the predetermined value.

* * * * *